(12) United States Patent
Suzuki et al.

(10) Patent No.: US 9,350,837 B2
(45) Date of Patent: May 24, 2016

(54) COMMUNICATION DEVICE USING A TRANSDUCER TO APPLY BENDING VIBRATION TO A CONTACT MEMBER

(75) Inventors: Masahiro Suzuki, Tokyo (JP); Daisaku Wakamatsu, Tokyo (JP)

(73) Assignee: KDDI Corporation, Tokyo (JP)

( * ) Notice: Subject to any disclaimer, the term of this patent is extended or adjusted under 35 U.S.C. 154(b) by 44 days.

(21) Appl. No.: 14/344,443

(22) PCT Filed: Sep. 10, 2012

(86) PCT No.: PCT/JP2012/073058
§ 371 (c)(1),
(2), (4) Date: Mar. 12, 2014

(87) PCT Pub. No.: WO2013/039033
PCT Pub. Date: Mar. 21, 2013

(65) Prior Publication Data
US 2014/0342783 A1 Nov. 20, 2014

(30) Foreign Application Priority Data

Sep. 13, 2011 (JP) .................................. 2011-199143
Aug. 30, 2012 (JP) .................................. 2012-190064

(51) Int. Cl.
*H04M 1/00* (2006.01)
*H04M 1/03* (2006.01)
*H04R 7/04* (2006.01)
*H04M 1/02* (2006.01)

(52) U.S. Cl.
CPC .............. *H04M 1/03* (2013.01); *H04M 1/0266* (2013.01); *H04R 7/045* (2013.01); *H04R 2499/11* (2013.01)

(58) Field of Classification Search
CPC ................................. H04M 1/035; H04M 1/05
USPC ................................................ 455/550.1–90.3
See application file for complete search history.

(56) References Cited

U.S. PATENT DOCUMENTS

2002/0198017 A1* 12/2002 Babasaki et al. .............. 455/550
2003/0059068 A1* 3/2003 Bank ..................... G06F 1/1616
381/152

(Continued)

FOREIGN PATENT DOCUMENTS

JP 2003145048 5/2003
JP 2006074798 A 3/2006

(Continued)

OTHER PUBLICATIONS

Letter of Evidence with four (4) appended related documents that were submitted to the Japanese Patent Office in one of the priority Japanese matters (JP2011-199143 and JP2012-190064) as evidence for claiming the exception to lack of novelty, pp. 1-35.

*Primary Examiner* — Ronald Eisner
(74) *Attorney, Agent, or Firm* — BainwoodHuang

(57) ABSTRACT

Provided is a communication device that facilitates hearing even in an environment in which hearing of sound is difficult only with air conduction sound, and requires fewer components, facilitates implementation. The communication device 100 includes: a protecting panel 101 serving as a contact member disposed at a position at which at least a part of the contact member is brought into contact with a user's ear and/or a human body around the ear; and an transducer 111 surface joined to the protecting panel 101, and configured to vibrate in a frequency band of an audible range such that vibration is not conducted from the protecting panel 101 to an auditory organ of the user via bones of a skull of the user.

9 Claims, 15 Drawing Sheets

(56) References Cited

U.S. PATENT DOCUMENTS

| | | |
|---|---|---|
| 2006/0140424 A1* | 6/2006 | Kobayashi ............. 381/190 |
| 2008/0279411 A1* | 11/2008 | Suzuki et al. ............. 381/386 |
| 2009/0129613 A1* | 5/2009 | Burton et al. ............. 381/190 |
| 2011/0301729 A1* | 12/2011 | Heiman et al. ............. 700/94 |
| 2012/0223616 A1* | 9/2012 | Bates ............. H03H 3/10 310/313 A |

FOREIGN PATENT DOCUMENTS

| | | |
|---|---|---|
| JP | 2006197146 | 7/2006 |
| JP | 2008245086 | 10/2008 |
| JP | 2010057112 | 3/2010 |
| JP | 2011129971 | 6/2011 |
| WO | 0221881 A1 | 3/2002 |
| WO | 2004023199 A1 | 3/2004 |
| WO | 2007086524 A1 | 8/2007 |

\* cited by examiner

COMMUNICATION DEVICE USING A TRANSDUCER TO APPLY BENDING VIBRATION TO A CONTACT MEMBER

This application is based on and claims the benefit of priority to (i) Japanese Patent Application No. 2011-199143, filed on Sep. 13, 2011, and (ii) Japanese Patent Application No. 2012-190064, filed on Aug. 30, 2012. Furthermore, in at least one of the above-identified applications and for this application, the grace period for the exception to lack of novelty has been claimed.

TECHNICAL FIELD

The present invention relates to a communication device such as a mobile phone terminal and a land-line phone terminal.

BACKGROUND ART

An application of panel loudspeakers in place of conventional loudspeakers has been known as means for outputting air conduction sound vibrating air when a mobile phone terminal receives a call or reproduces music (see PTL 1, for example). However, there may be a problem that it is difficult to hear the sound only with air conduction sound, when noises are larger than the air conduction sound.

By contrast, it is known that bone conduction is effective where ambient noises are large (see PTL 2, for example). However, strong vibration as produced in bone conduction that vibrates bones of the skull is not suitable for devices such as mobile phones that use little electricity in terms of power consumption. As the sound by bone conduction is small in the first place, it may be easily lost among the air conduction sound. Therefore, there is a drawback that a manufacturing process becomes complicated as it is necessary to increase the vibration, and a vibration unit and a casing are required to be configured separately so that the large vibration may not be conducted to the casing.

Further, in the conventional transducer, if a protecting panel is made of a hard material such as glass, or if the edges are adhered for waterproof, a large amount of electricity is required in order to vibrate a surface of the protecting panel. Therefore, the conventional transducer is not suitable for devices such as mobile phones that use little electricity in terms of power consumption.

CITATION LIST

Patent Literature

PTL 1: Japanese Patent No. 3929465
PTL 2: Japanese Unexamined Patent Application Publication No. 2003-145048

SUMMARY OF INVENTION

Technical Problem

An object of the present invention is to provide a communication device that facilitates hearing even in an environment in which hearing of sound is difficult only with air conduction sound, requires fewer components, facilitates implementation, and works with small power consumption.

Solution to Problem

In order to solve the above problem, the present invention proposes the following matters. Numbers corresponding to, but not limited to, embodiments of the present invention are attached in the following for better understanding.

(1) The present invention proposes a communication device (100, 200, 300, 400, 500) including: a contact member (101, 210, 340, 401) disposed at a position at which at least a part of the contact member is brought into contact with a user's ear and/or a human body around the ear; and an transducer (111, 211, 311, 411, 511) surface joined to the contact member, and configured to vibrate in a frequency band of an audible range such that vibration is not conducted from the contact member to an auditory organ of the user via bones of a skull of the user.

According to the present invention, the contact member is disposed at the position at which at least a part of the contact member is brought into contact with the user's ear and/or the human body around the ear. The transducer is surface joined to the contact member, and configured to vibrate in the frequency band of the audible range such that vibration is not conducted from the contact member to the auditory organ of the user via bones of the skull of the user. Therefore, the communication device facilitates hearing even in an environment in which hearing of sound is difficult only with air conduction sound, requires fewer components, facilitates implementation, and reduces power consumption.

(2) The present invention proposes a communication device (100, 200, 300, 400, 500) including: a contact member (101, 210, 340, 401) disposed at a position at which at least a part of the contact member is brought into contact with a user's ear and/or a human body around the ear; and an transducer (111, 211, 311, 411, 511) surface joined to the contact member, and configured to vibrate in a frequency band of an audible range such that out of air conduction sound and vibration that are conducted from the contact member to an auditory organ, vibration conducted to an inner ear of the user via bones of a skull of the user is smaller than vibration and air conduction sound conducted to the inner ear of the user via an outer ear of the user.

According to the present invention, the contact member is disposed at the position at which at least a part of the contact member is brought into contact with the user's ear and/or the human body around the ear. The transducer is surface joined to the contact member, and configured to vibrate in the frequency band of the audible range such that out of air conduction sound and vibration that are conducted from the contact member to the auditory organ via the human body of the user, vibration conducted to the inner ear of the user via bones of the skull of the user is smaller than vibration and air conduction sound conducted to the inner ear of the user via the outer ear of the user. Therefore, the communication device is able to conduct vibration, in addition to air conduction sound, to the human body in an environment in which hearing of sound is difficult only with air conduction sound, requires fewer components, facilitates implementation, and reduces power consumption.

Advantageous Effects of Invention

According to the present invention, the communication device is able to conduct vibration, in addition to air conduction sound, to the human body even in an environment in which sound is hard to be heard only with air conduction sound, for example, and transmitted sound may be easily heard.

Further, the communication device according to the present invention may be implemented more easily than the conventional bone conduction device, and it is possible to reduce power consumption and fewer components.

Moreover, even when the casing or the like of the communication device vibrates, no discomfort is given as a magnitude of the vibration is too small to give any a sense of touch.

DESCRIPTION OF EMBODIMENTS

Hereinafter, embodiments of the present invention will be described in detail with reference to the drawings.

It should be noted that components in the embodiments may be replaced by existing components and the like as appropriate, or may be configured in various different manners including combinations with other existing components. Therefore, the scope of the invention defined by the appended claims may not be limited to the embodiments.

First Embodiment

Figure 1:
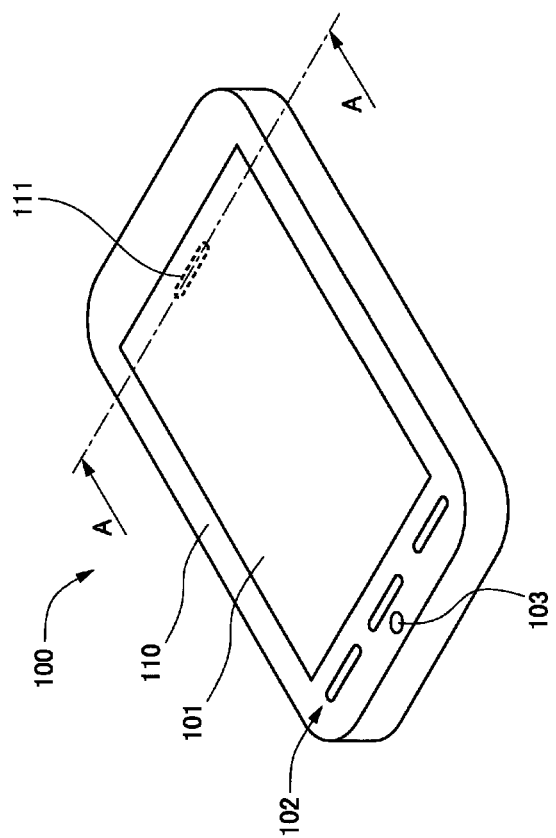
FIG. 1 is a perspective view illustrating a communication device 100 according to a first embodiment.

FIG. 1 is a perspective view illustrating a communication device 100 according to a first embodiment.

The drawings, including FIG. 1, are schematic, and sizes and shapes of components are shown figuratively as needed in order to facilitate understanding.

In the following description, a surface shown in FIG. 1 is called a front surface, and a surface not shown is called a back surface.

The communication device 100 is a mobile phone terminal including a protecting panel 101, an operation key 102, and a microphone 103 on the front surface of a casing 110.

The protecting panel 101 is provided over a display screen, and configured as a contact member allowing sound transmission using cartilage conduction according to the present invention by having at least a portion of the protecting panel 101 be brought into contact with a user's ear or a human body around the ear. The protecting panel 101 is preferably made of a transparent resin material with thickness equal to or thinner than 1 mm of acrylic, PET, or the like, but may be a reinforced glass material as a display unit protecting panel. In any case, it is preferable to use a material having a high bending strength for the protecting panel 101 so that the panel may not be bent largely due to an external pressure and an transducer 111 may not be broken.

In the protecting panel 101 according to this embodiment, the front surface is configured as a touch panel, and has a function as a display unit for displaying various information of the communication device 100, and a function as an operation unit to be operated when inputting numbers and characters or in various selections.

Further, on a back side of the protecting panel 101, the transducer 111 is provided. The transducer 111 will be described later.

The operation key 102 is an operation member provided so that an input operation is performed without using the touch panel.

The microphone 103 is a microphone for inputting sound during a call.

Figure 2:
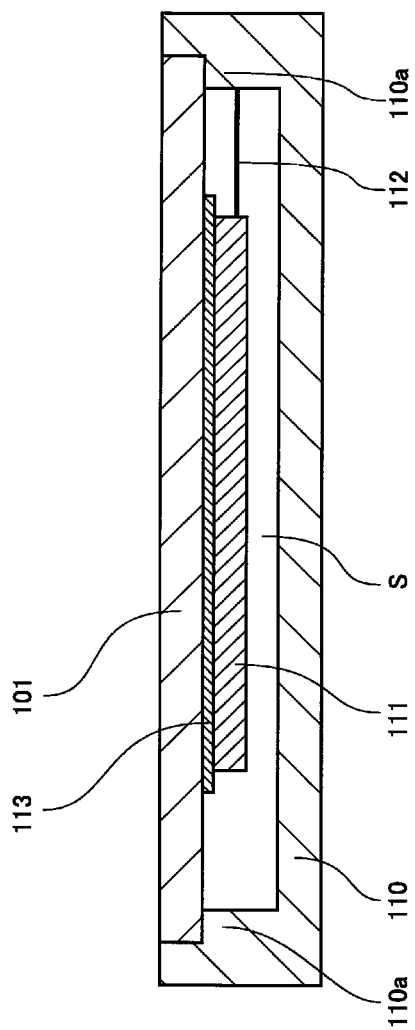
FIG. 2 is a sectional view of the communication device 100 taken along line indicated by arrows A-A in FIG. 1.

FIG. 2 is a sectional view of the communication device 100 taken along line indicated by arrows A-A in FIG. 1.

A circumferential edge of the protecting panel 101 is fixed to the casing 110. Further, to the back side of the protecting panel 101, the transducer 111 is surface joined by a double-sided tape 113.

The casing 110 is formed by resin, metal die cast of aluminum, or the like. The casing 110 is provided with a fixing part 110a for fixing the protecting panel 101 in correspondence with the circumferential edge of the protecting panel 101.

An entire surface of the transducer 111 is attached to the protecting panel 101 by the double-sided tape 113, and vibration of the transducer 111 is directly conducted to the protecting panel 101. Further, the transducer 111 vibrates, according to a sound signal, at a frequency band of an audible range that is not conducted to an auditory organ of the user from the protecting panel 101 via bones of the skull of the user. In other words, the vibration of the transducer 111 is weaker than the conventional bone conduction.

In this embodiment, the transducer 111 vibrates such that the vibration may not be conducted to the auditory organ of the user from the protecting panel 101 via the bones of the skull of the user. Here, when the power supplied to the transducer 111 is increased or when the user presses a protecting panel 101 against the bones of the skull with a strong force, a part of the vibration of the transducer 111 may be possibly conducted slightly to the auditory organ of the user via the bones of the skull. However, in the present invention, in order to reduce power consumption, the power supplied to the transducer 111 does not produce vibration sufficient to vibrate the protecting panel 101 to vibrate the bones of the skull. Therefore, among the vibration conducted from the protecting panel 101 to the auditory organ and the air conduction sound, vibration conducted to an inner ear of the user via the bones of the skull of the user is sufficiently smaller than vibration conducted to the inner ear of the user via an outer ear of the user and the air conduction sound.

The vibration produced by the transducer 111 according to the embodiment is bending vibration, in place of simple vertical vibration. Applying vibration to bend the protecting panel 101 by the bending vibration of the transducer 111 causes the front surface of the protecting panel 101 to vibrate in an undulating manner, and the air conduction sound is produced from a plurality of waves generated in a surface of the protecting panel.

Figure 8:
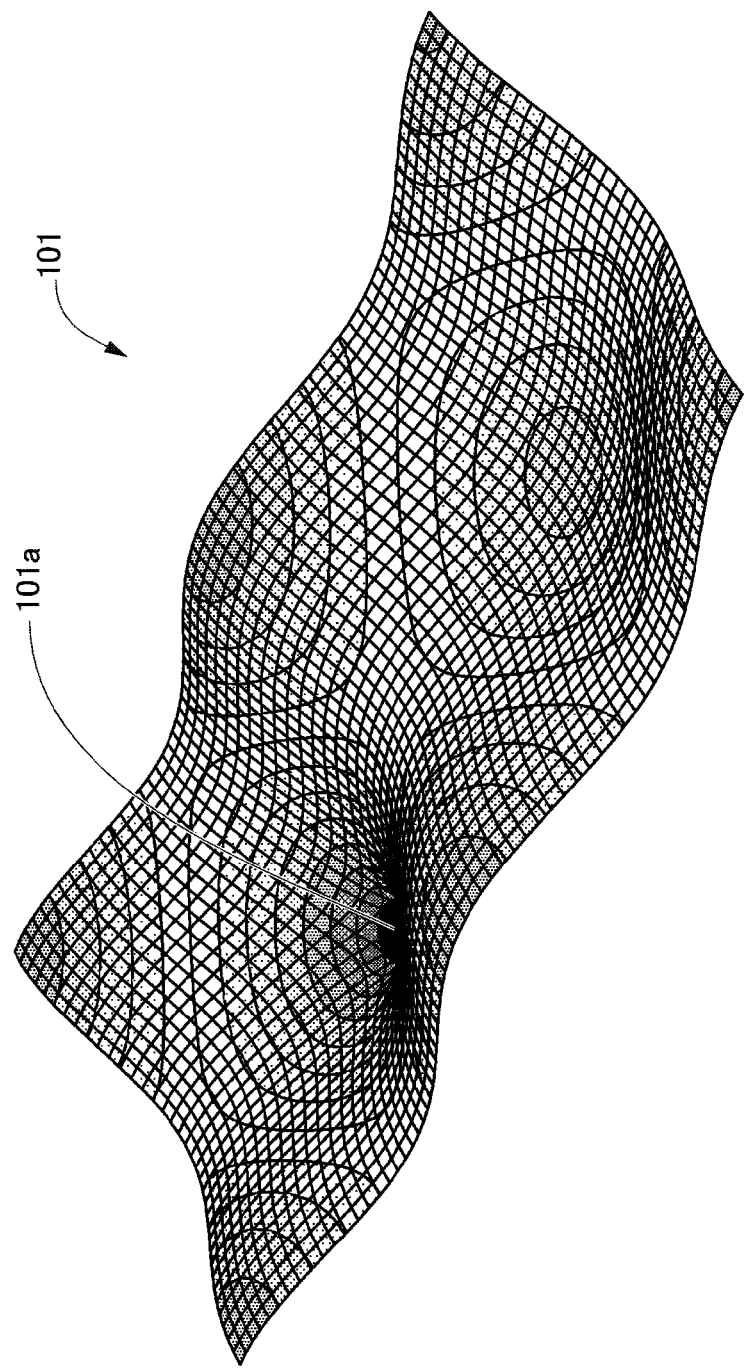
FIG. 8 is a diagram exaggeratingly illustrating vibration of the protecting panel 101.

FIG. 8 is a diagram exaggeratingly illustrating the vibration of the protecting panel 101. Large bending vibration is produced locally at a vibration position 101a corresponding to a position at which the transducer 111 is applied. The bending vibration is conducted from the vibration position 101a to the other positions of the protecting panel 101, and amplitude of the vibration becomes smaller as a distance from the vibration position 101a becomes longer. As the transducer 111 makes bending vibration in this manner, it is possible to produce required vibration in the protecting panel 101 with reduced power consumption even when the protecting panel 101 is made of a hard material such as glass, or when the edges are adhered for waterproof or the like.

The vibration is then conducted to a cartilage near the user's ear via the protecting panel 101 to generate sound waves within an ear canal, and the generated sound waves are conducted to an eardrum and recognized as final sound. The vibration produced by the transducer 111 according to this embodiment is conducted to the cartilage near the user's ear via the protecting panel 101, and air conduction sound is generated within the ear canal. Further, air conduction sound is generated due to the vibration of the protecting panel 101. Then, the vibration conducted via the cartilage and the vibration by the air conduction sound are conducted to the eardrum, and recognized as final sound. According to the conventional bone conduction, the bones of the skull are vibrated, and the vibration is directly transmitted into the inner ear (a cochlea, a semicircular canal, and the like), and thus the sound is recognized. Therefore, while the eardrum is not used, required energy for the vibration is large. On the other hand, this method is greatly different from the bone conduction in that it first vibrates the ear canal to produce sound wave vibration (air conduction sound) by air, which is recognized as common sound through the eardrum. Further, as it is not necessary to vibrate the bones, it is possible to transmit the sound even with very small vibration as compared to the bone conduction, and therefore an amount of energy required for the vibration is small.

The transducer 111 according to this embodiment is a piezoceramic bimorph element formed in a reed shape, that is, in a plated shape that is rectangular when seen along a direction of a normal line of the plated surface. The transducer 111 is driven in a bending mode (flexural vibration). A piezoelectric material used for the transducer 111 is an element in which 16 layers of a highly displaceable piezoelectric material whose D31 constant is 260 pm/V and whose thickness is 30 μm thick are stacked. The size of the transducer 111 is 23.5 mm×3.3 mm×0.5 mm, and its capacity is 1 μF (at 1 kHz). The transducer 111 is driven at a voltage from 0 Vpp to 22 Vpp.

As the transducer 111 made of the piezoelectric element is a capacitive load, the transducer 111 vibrates such that the sound signal is reproduced by applying a voltage strict to a sound signal from a D-class amplifier of a voltage driving type to the piezoelectric element. Examples of the D-class amplifier include AK7845 available from Asahi Kasei Microdevices Corporation.

A line 112 is a conducting wire for transmitting a signal required for driving to the transducer 111.

The double-sided tape 113 is an adhesive member for joining the transducer 111 with the protecting panel 101. A base material of the double-sided tape 113 is a non-woven fabric, acrylic foam, or the like, and an adhesive material is a strong acrylic material (about 15 N/20 mm), and a versatile double-sided tape that is durable and tape-dimensionally stable is used. It is preferable that the thickness of the double-sided tape 113 is from 0.1 mm to 0.2 mm (for example, 810HD available from DIC Corporation).

There is an air gap S between the casing 110 and the transducer 111. By providing the air gap S, it is possible to prevent vibration of the transducer 111 and the protecting panel 101 from being disturbed. A soft elastic member such as a sponge-like member that may not disturb vibration may be provided in the air gap S. Any elastic member may be used as long as it deforms following the vibration of the transducer 111, and may be elastomer or the like whose hardness is low, for example.

When the transducer 111 vibrates based on the sound signal, the protecting panel 101 vibrates along with the transducer 111 to produce air conduction sound. At this time, if the user presses a portion of the protecting panel 101 near the transducer 111 against the cartilage near the ear, the vibration of the protecting panel 101 is conducted to the cartilage, and air conduction sound is produced within the ear canal. Then, the vibration via the cartilage and the vibration of the air conduction sound are conducted to the eardrum, and thus the user recognizes the vibration as sound.

As described above, according to the first embodiment, in addition to the air conduction sound produced by the vibration of the protecting panel 101, the vibration weaker than bone conduction causes the cartilage near the ear to vibrate, and thus the air conduction sound is produced within the ear canal. Then, the air conduction sound produced by the protecting panel 101, the air conduction sound produced within the ear canal via the cartilage, and the vibration directly conducted to the eardrum from the cartilage are conducted to the eardrum, and cause the eardrum to vibrate. In this manner, according to the first embodiment, the communication device 100 is able to conduct two types of air conduction sound and the vibration to the eardrum, and to perform sound transmission that can be easily heard even in a noisy environment.

Further, even when a device that blocks external air conduction sound, for example, by blocking the ear canal (for example, canal earphones, earplugs, noise reduction ear muffs, or the like) is worn, bringing the communication device 100 into contact with this device causes the device to vibrate to produce the air conduction sound on the side of the ear canal. This also conducts the vibration to a human body.

Moreover, as the transducer 111 is simply attached to the protecting panel 101, it is possible to reduce the number of components and to facilitate manufacturing.

Furthermore, the communication device 100 is highly water-resistant and dust-resistant, as a hole for transmitting the air conduction sound for receivers (tone hole) is not necessary. In addition, as a tone hole is not necessary, a problem that sound becomes indiscernible when the tone hole is blocked by the ear or the like may not occur.

Further, as the energy for the vibration of the transducer 111 is significantly smaller than that of the conventional bone conduction, the user may not feel uncomfortable vibration, and the power consumption may be reduced low.

Second Embodiment

Figure 3:
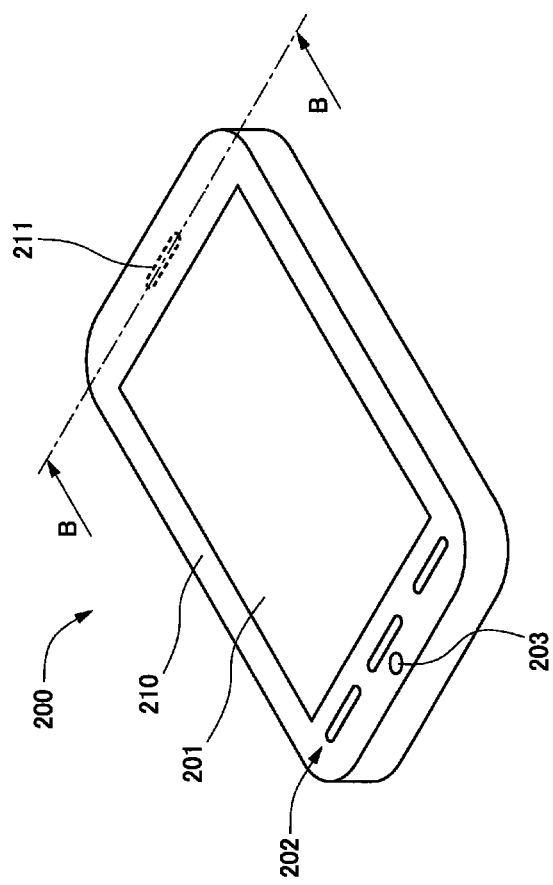
FIG. 3 is a perspective view illustrating a communication device 200 according to a second embodiment.

FIG. 3 is a perspective view illustrating a communication device 200 according to a second embodiment.

In the following description, a surface shown in FIG. 3 is called a front surface, and a surface not shown is called a back surface.

Components that serve the same functions as those in the first embodiment described above are denoted by the same suffix reference numerals, and descriptions that may be overlapping shall be omitted.

Similarly to the communication device 100 according to the first embodiment, the communication device 200 according to the second embodiment is a mobile phone terminal including a protecting panel 201, an operation key 202, and a microphone 203 on the front surface of a casing 210.

However, the communication device 200 according to the second embodiment is provided with an transducer 211 at a portion different from the case in the first embodiment. Specifically, the transducer 211 is surface joined from the back surface of the casing 210.

Figure 4:
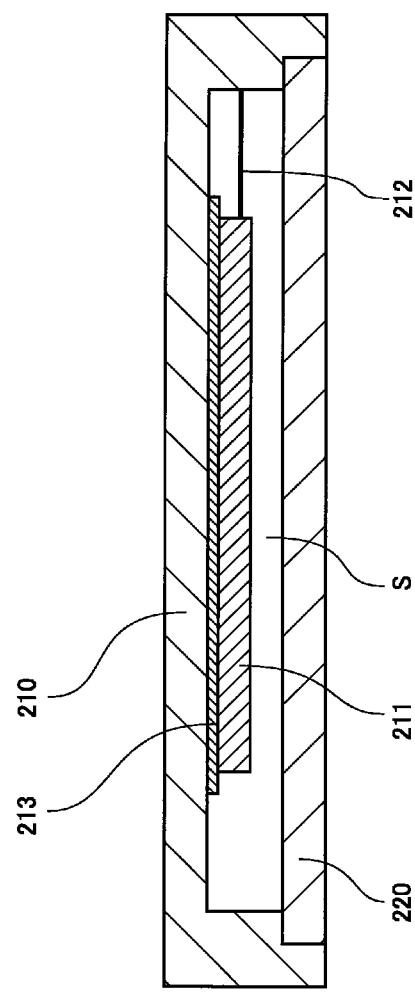
FIG. 4 is a sectional view of the communication device 200 taken along line indicated by arrows B-B in FIG. 3.

FIG. 4 is a sectional view of the communication device 200 taken along line indicated by arrows B-B in FIG. 3.

The communication device 200 is configured such that the transducer 211 is surface joined by a double-sided tape 213 from the back surface at a portion near one end of the casing 210.

The casing 210 is formed by resin, metal die cast of aluminum, or the like. It is preferable to use a material having a high bending strength for the casing 210 so that the casing may not be bent largely due to an external pressure and the transducer 211 may not be broken.

An entire surface of the transducer 211 is attached to the casing 210 by the double-sided tape 213, and vibration of the transducer 211 is directly conducted to the casing 210. Further, the transducer 211 is the same as the transducer 111 according to the first embodiment other than that the applied portion is different. Further, the transducer 211 vibrates, according to a sound signal, at a frequency band of an audible range that is not conducted to an auditory organ of the user from the casing 210 via bones of the skull of the user. In other words, the vibration of the transducer 211 is weaker than the conventional bone conduction.

The vibration produced by the transducer 211 according to this embodiment is conducted to the cartilage near the user's ear via the casing 210. Action of the vibration conducted to the cartilage is the same as that in the first embodiment.

A line 212 is a conducting wire for transmitting a signal required for driving to the transducer 211.

The double-sided tape 213 is an adhesive member for joining the transducer 211 with the casing 210. The double-sided tape 213 itself is the same as the double-sided tape 113 according to the first embodiment.

On the side of the back surface of the communication device 200, a rear casing 220 is provided. The rear casing 220 is fixed to the casing 210 from the side of the back surface, and the transducer 211 is provided between the casing 210 and the rear casing 220.

There is an air gap S between the casing 210 and the rear casing 220. By providing the air gap S, it is possible to prevent vibration of the transducer 211 and the casing 210 from being disturbed. An elastic member may be provided in the air gap S, as described in the first embodiment.

When the transducer 211 vibrates based on the sound signal, the casing 210 vibrates along with the transducer 211 to produce air conduction sound. At this time, if the user presses a portion of the casing 210 near the transducer 211 against the cartilage near the ear, the vibration of the casing 210 is conducted to the cartilage, and air conduction sound is produced within the ear canal. Then, the vibration via the cartilage and the vibration of the air conduction sound are conducted to the eardrum, and thus the user recognizes the vibration as sound.

As described above, according to the second embodiment, as the transducer 211 is applied to the casing 210 by surface joining, the communication device 200 may provide the same effects as those provided by the communication device 100 according to the first embodiment. Further, the communication device 200 may employ the present invention without limiting original functions of the protecting panel 201 in order to implement the present invention, or without limiting implementation of the present invention in order to prioritize the functions of the protecting panel 201.

Third Embodiment

Figure 5:
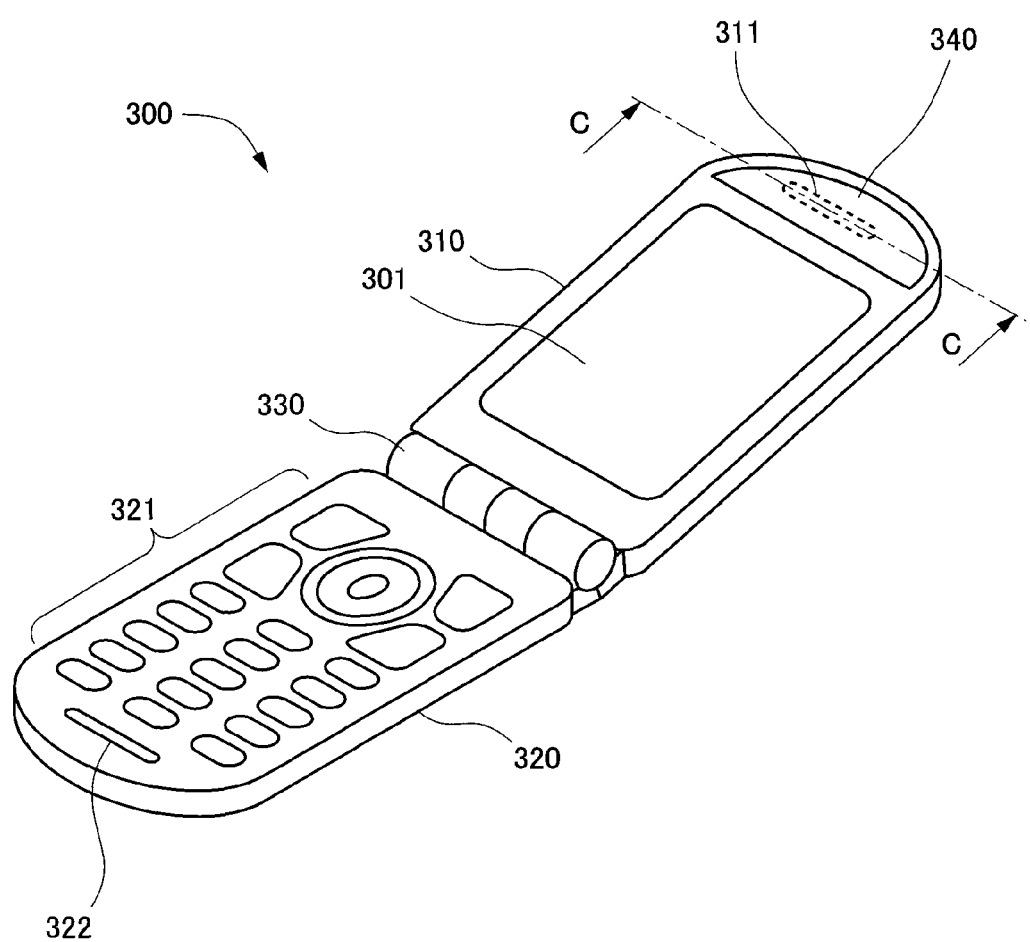
FIG. 5 is a perspective view illustrating a communication device 300 according to a third embodiment.

FIG. 5 is a perspective view illustrating a communication device 300 according to a third embodiment.

Components that serve the same functions as those in the first embodiment described above are denoted by the same suffix reference numerals, and descriptions that may be overlapping shall be omitted.

The communication device 300 according to the third embodiment is a foldable mobile phone terminal in which a first casing 310 and a second casing 320 are configured as movable parts rotatably movable via a shaft section 330.

While the protecting panel 101 or the casing 210 also serves as the contact member in the communication device according to the first embodiment and the second embodiment, the communication device 300 according to the third embodiment is provided with a contact member separately from a casing or the like.

FIG. 5 shows a use state in which the first casing 310 and the second casing 320 are unfolded. In the following description, surfaces of the first casing 310 and the second casing 320 that face each other when folded, that is, the sides shown in FIG. 5, are called front surfaces. On the other hand, outer surfaces of the first casing 310 and the second casing 320 in a stored state in which the first casing 310 and the second casing 320 are folded, that is, the sides not shown in FIG. 5 are called back surfaces.

The front surface of the first casing 310 is provided with a protecting panel 301 and a contact member 340.

The protecting panel 301 is provided over a display screen to protect the display screen.

The contact member 340 is positioned near an end away from the shaft section 330 of the first casing 310, and may be brought into contact with the user's ear and/or the human body around the ear. On the back side of the contact member 340, an transducer 311 is provided. For the contact member 340, it is preferable to use a material having a high bending strength so that the contact member may not be bent largely due to an external pressure and the transducer 311 may not be broken. The contact member 340 and the transducer 311 will be described later in detail.

The front surface of the second casing 320 is provided with operation keys 321 and a microphone 322.

The operation keys 321 are operation members that are manipulated for inputting numbers and letters, making various selections, or the like.

The microphone 322 is a microphone for inputting sound during a call.

Figure 6:
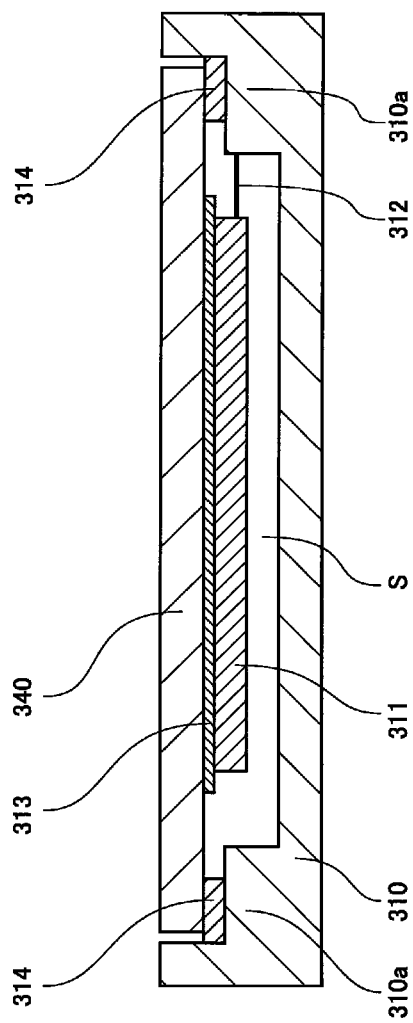
FIG. 6 is a sectional view of the communication device 300 taken along line indicated by arrows C-C in FIG. 5.

FIG. 6 is a sectional view of the communication device 300 taken along line indicated by arrows C-C in FIG. 5.

A circumferential edge of the contact member 340 is fixed to the first casing 310 via the double-sided tape 314. Further, to the back side of the contact member 340, the transducer 311 is surface joined by a double-sided tape 313. The transducer 311 and the double-sided tape 313 are configured in the same manner as the transducer 111 and the double-sided tape 113 according to the first embodiment, and the line 312 is provided in the same manner as the line 112 in the first embodiment. The front surface of the contact member 340 may be covered by a silicon rubber or the like in order to provided soft touch for the human body.

The first casing 310 is formed by resin, metal die cast of aluminum, or the like. The first casing 310 is provided with a fixing part 310a for fixing the contact member 340 in correspondence with the circumferential edge of the contact member 340. Further, the contact member 340 is fixed such that a double-sided tape 314 is sandwiched between the contact member 340 and the fixing part 310a. By sandwiching the double-sided tape 314, the contact member 340 is not in direct contact with the first casing 310. Therefore, the contact member 340 is held in a manner easily vibrated due to the flexibility of the double-sided tape.

Further, it is also preferable to reduce resonance of the contact member 340 by increasing an area of joining between the contact member 340 and the fixing part 310a as much as possible.

As described above, according to the third embodiment, as the transducer 311 is applied to the contact member 340 by surface joining, the communication device 300 may provide the same effects as those provided by the communication device 100 according to the first embodiment. Further, as the communication device 300 is provided with the contact member 340, it is possible to use a material suitable for transmitting vibration without being influenced by the first casing 310 or the protecting panel 301. Further, as the contact member 340 is held in a manner easily vibrated due to the flexibility of the double-sided tape 314, the communication device 300 is able to prevent a loss in the vibration energy.

Fourth Embodiment

Figure 7:
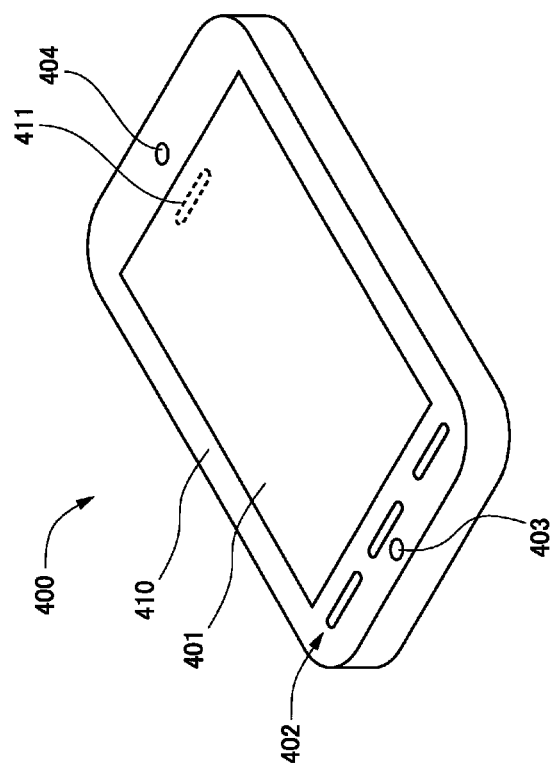
FIG. 7 is a perspective view illustrating a communication device 400 according to a fourth embodiment.

FIG. 7 is a perspective view illustrating a communication device 400 according to a fourth embodiment.

Components that serve the same functions as those in the first embodiment described above are denoted by the same suffix reference numerals, and descriptions that may be overlapping shall be omitted.

The communication device 400 is a mobile phone terminal including a protecting panel 401, an operation key 402, a microphone 403, and an electromagnetic receiver 404 on the front surface of a casing 410.

The protecting panel 401, the operation key 402, and the microphone 403 are respectively configured in the same manner as the protecting panel 101, the operation key 102, and the microphone 103 in the first embodiment. Similarly to the first embodiment, on the back side of the protecting panel 401, an transducer 411 is provided by surface joining.

The electromagnetic receiver 404 is a small loudspeaker that outputs air conduction sound during a call.

According to the communication device 400 of the fourth embodiment, during a call, the protecting panel 401 vibrates due to the vibration of the transducer 411 described above so as to produce air conduction sound as well as to transmit vibration to the human body. Further, the communication device 400 positively generates air conduction sound through the electromagnetic receiver 404.

As described above, the communication device 400 according to the fourth embodiment is provided with the transducer 411 and the electromagnetic receiver 404 at the same time, and may be provided as a communication device with which sound is more clearly heard.

Fifth Embodiment

Figure 9:
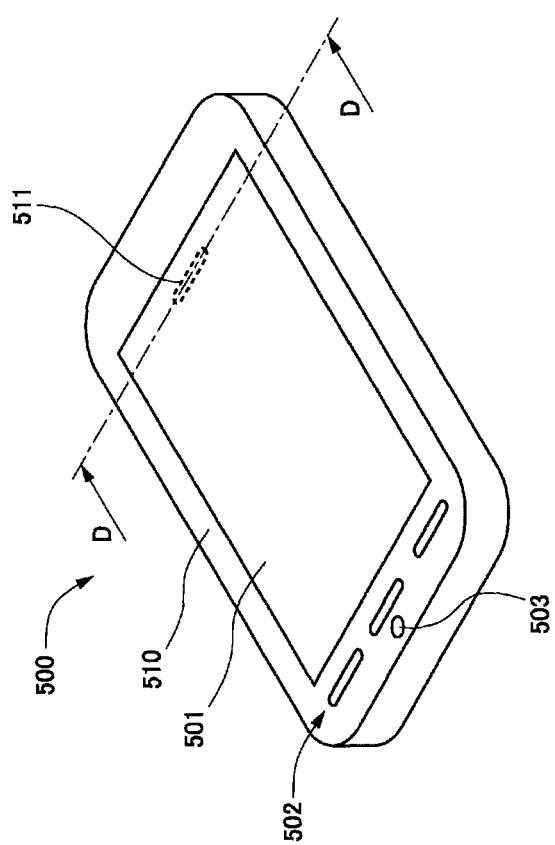
FIG. 9 is a perspective view illustrating a communication device 500 according to a fifth embodiment.

FIG. 9 is a perspective view illustrating a communication device 500 according to a fifth embodiment.

In the following description, a surface shown in FIG. 9 is called a front surface, and a surface not shown is called a back surface.

Components that serve the same functions as those in the first embodiment described above are denoted by the same suffix reference numerals, and descriptions that may be overlapping shall be omitted.

Similarly to the communication device 100 according to the first embodiment, the communication device 500 according to the fifth embodiment is a mobile phone terminal including a protecting panel 501, an operation key 502, and a microphone 503 on the front surface of a casing 510.

Figure 10:
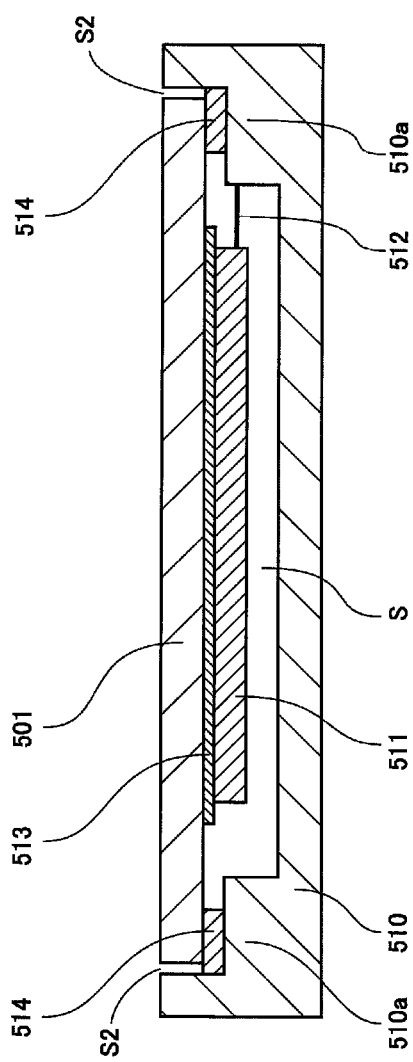
FIG. 10 is a sectional view of the communication device 500 taken along line indicated by arrows D-D in FIG. 9.

FIG. 10 is a sectional view of the communication device 500 taken along line indicated by arrows D-D in FIG. 9.

A circumferential edge of the protecting panel 501 is fixed to the casing 510 via a double-sided tape 514. Further, to the back side of protecting panel 501, an transducer 511 is surface joined by a double-sided tape 513. The transducer 511 is a piezoceramic bimorph element formed in a reed shape, that is, in a plated shape that is rectangular when seen along a direction of a normal line of the plated surface. The transducer 511 is driven in a bending mode (flexural vibration). A piezoelectric material used for the transducer 511 is an element in which 24 layers of a highly displaceable piezoelectric material whose D31 constant is 260 μm/v and whose thickness is 30 μm thick are stacked. The size of the transducer 511 is 23.5 mm×4.5 mm×0.7 mm. The transducer 511 is driven at a voltage from 0 Vpp to 30 Vpp. Thus, with the transducer 511, it is possible to obtain a higher vibration output than in the case of the first embodiment. The communication device 500 according to this embodiment is provided with an operation mode in which sound is reproduced normally (hereinafter referred to as a normal mode) as well as a large volume mode in which sound is reproduced in a volume significantly larger than that in the normal mode. In this embodiment, by using a piezoelectric element in which 24 layers are stacked, the piezoelectric element is driven with a margin in its capacity in the normal mode. In the large volume mode, by contrast, it is possible to produce sound in a large volume by supplying a signal for causing the piezoelectric element to produce a larger vibration. The large volume mode will be described later in detail. Here, the transducer 511 is attached in the same manner as the transducer 111 in the first embodiment. The double-sided tape 513 is the same as the double-sided tape 113 in the first embodiment, and a line 512 is also the same as the line 112 in the first embodiment.

The casing 510 is formed by resin, metal die cast of aluminum, or the like. The casing 510 is provided with a fixing part 510a for fixing the protecting panel 501 in correspondence with the circumferential edge of the protecting panel 501. Further, the protecting panel 501 is fixed such that the double-sided tape 514 is sandwiched between the protecting panel 501 and the fixing part 510a. By sandwiching the double-sided tape 514, the protecting panel 501 is not in direct contact with the casing 510. In addition, there is an air gap S2 between the circumferential edge of the protecting panel 501 and the casing 510, and the protecting panel 501 is not in direct contact with the casing 510 at this portion, keeping a predetermined distance. Therefore, the protecting panel 501 is held in a manner easily vibrated due to the flexibility of the double-sided tape, and is able to produce a large vibration. Further, as the protecting panel 501 may not be brought into contact with the casing 510, it is possible to prevent uncomfortable vibrating sound from being produced by the protecting panel 501 and the casing 510 are brought into contact with each other during the vibration even when the protecting panel 501 produces a large vibration. Further, it is also preferable to reduce resonance of the protecting panel 501 by increasing an area of joining between the protecting panel 501 and the fixing part 510a as much as possible.

Figure 11:
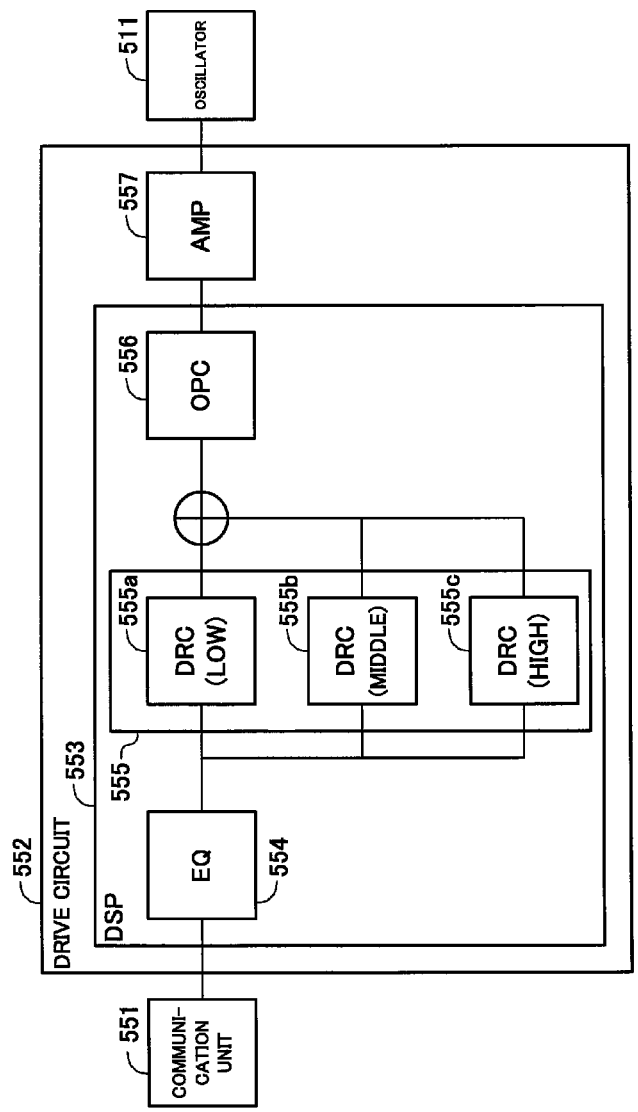
FIG. 11 is a block diagram illustrating an outline of an internal structure of the communication device 500 according to the fifth embodiment.

FIG. 11 is a block diagram illustrating an outline of an internal structure of the communication device 500 according to the fifth embodiment.

The communication device 500 includes the transducer 511, a communication unit 551, and a drive circuit 552.

The communication unit 551 is a circuit for managing calls. From the communication unit 551, a sound signal is outputted to the drive circuit 552.

The drive circuit 552 is a circuit for generating a signal for driving the transducer 511. The drive circuit 552 includes an equalizer unit (EQ) 554, a dynamic range compressor (DRC) 555, an output power controller (OPC) 556, and an amplifier (AMP) 557.

The equalizer unit (EQ) 554 performs frequency equalizing. The equalizer unit 554 performs frequency equalizing to a sound signal obtained by the communication unit 551 when required, and then sends the resulting signal to the dynamic range compressor 555. A specific operation of the equalizer unit 554 will be described later.

The dynamic range compressor (DRC) 555 produces sounds that can be easily heard using a DRC (dynamic range compression) function. The dynamic range compressor 555 performs dynamic range compression processing to the sound signal obtained from the equalizer unit 554 when required, and then sends the resulting signal to the output power controller 556. A specific operation of the dynamic range compressor 555 will be described later.

The output power controller (OPC) 556 limits an output. This function of the output power controller 556 prevents a disadvantageous excessive output from being generated when adding output results of three-band DRC of the dynamic range compressor 555. This function prevents the excessive output from damaging an auditory function.

The amplifier (AMP) 557 is an amplifier unit configured to amplify a sound signal obtained from the output power controller 556 and outputs the amplified signal to the transducer 511. Examples of the amplifier 557 include NJW1263 available from New Japan Radio Co., Ltd. The amplifier 557 increases an amplification factor more significantly in the large volume mode than in the normal mode.

Next, the large volume mode will be described. As described above, the communication device 500 according to this embodiment is provided with, in addition to the normal mode, the large volume mode in which sound is reproduced in a volume significantly larger than that in the normal mode. The normal mode is a mode of sound transmission suitable for a user without hard-of-hearing. The large volume mode, by contrast, is a mode of sound transmission that facilitates hearing for a user with a decreased hearing ability and having difficulty in hearing in the normal mode (hereinafter referred to as a hard-of-hearing person). The mode is preferably set in a manufacturing factory or a dealer, for example, instead of setting by the user. Further, when changing the setting, specific operational parameters of the equalizer unit 554 and the dynamic range compressor 555 are set to values appropriate for the user (hard-of-hearing person).

During the normal mode, the drive circuit 552 causes the transducer 511 to vibrate while suppressing the amplification factor for the signal by the amplifier 557 to be low. Further, during the normal mode, the drive circuit 552 does not make the equalizer unit 554 and the dynamic range compressor 555 work.

On the other hand, during the large volume mode, the drive circuit 552 increases the amplification factor for the signal by the amplifier 557, and make the equalizer unit 554 and the dynamic range compressor 555 work.

Here, a degree of the volume to be set during the large volume mode will be described. In an actual call, as there are various sound sources and a receiving condition varies for each user, a volume during the large volume mode is determined using a testing method as described below.

A sinusoidal sound at 1 kHz is inputted to the communication device 500, and the setting is made such that the sound outputted from the communication device 500 is maximized. Then, the protecting panel 501 is attached to a device compliant with ITU-T Recommendations P.58, for example, a standard dummy ear (Standardized Right Ear Simulator Type 4158C) of a type 4128d HATS (Head And Torso Simulator) available from B&K. Then the position of the protecting panel 501 which is at the center of the position applied to the dummy ear is aligned with a position immediately above the transducer 511 or a position at which a maximum volume is outputted using a calibrated handset positioner (Type 4606). In this state, the protecting panel 501 is applied to the dummy ear with a pressure ranging from 4 N to 10 N. Then, the amplification factor of the amplifier 557 is set such that outputted air conduction sound is 100 dBA or above when a degree of loudness in dBA is measured after a sound pressure of air conduction sound from a calibrated microphone at a position of the eardrum passes through an A-weighting filter defined by IEC60651 standard.

In this setting, the communication device 500 outputs sound at 100 dBA only by air conduction sound. However, in practical use, not only the air conduction sound, but a vibration component conducted from the protecting panel 501 to the human body is conducted to the auditory organ, the loudness of the sound the user feels (loudness) is greater than the air conduction sound.

During the large volume mode, the equalizer unit 554 takes a measure for audibility for a hard-of-hearing person using an EQ function, and a measure for sound leakage using the EQ function.

As audibility of hard-of-hearing persons may have different frequency characteristics, it is possible to transmit sound that is more easily heard by performing advanced frequency equalizing in accordance with suitable audibility characteristics (e.g., 10-band EQ function). Thus, it is preferable to make setting values for equalizing for a hard-of-hearing person to be suitable for individual users.

Further, a piezoelectric element has a characteristic that an output in a frequency band ranging from 2 KHz to 4 KHz is high. By suppressing excessively outputted sound in the band frequency through the equalizing processing, it is possible to suppress an output of sound that is prominent as the sound leakage in the frequency band ranging from 2 kHz to 4 kHz while improving the frequency characteristics.

Figure 12:
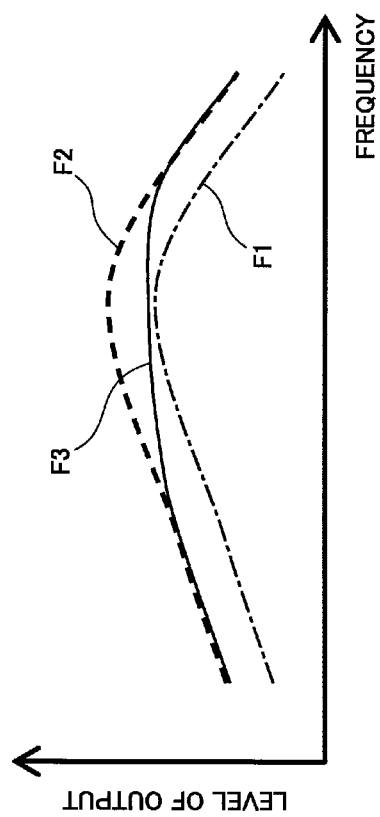
FIG. 12 is a diagram showing one example of frequency equalizing performed by an equalizer unit 554.

FIG. 12 is a diagram showing one example of the frequency equalizing performed by an equalizer unit 554.

According to this embodiment, as the transducer 511 providing a higher vibration output in the large volume mode than in the normal mode is used, it is possible to improve the frequency characteristics while ensuring appropriate vibration amplitude without reducing the vibration in an area in which vibration is attenuated by frequency equalizing processing too much.

The frequency equalizing processing is described specifically with reference to FIG. 12.

A characteristic F1 indicated by an alternate long and short dash line in FIG. 12 represents a frequency characteristic when the transducer 511 is driven at 22 Vpp in the normal mode.

A characteristic F2 indicated by a dashed line in FIG. 12 represents a frequency characteristic when the transducer 511 is driven at 30 Vpp in the large volume mode.

A characteristic F3 indicated by a solid line in FIG. 12 represents a frequency characteristic when the transducer 511 is driven at 30 Vpp in the large volume mode and the frequency equalizing processing is performed.

In the characteristic F2, a level of vibration as a whole is increased higher than that in the characteristic F1 in the normal mode, as the transducer 511 having 24 layers is driven in the large volume mode. However, a tendency that an output in a frequency band ranging from 2 KHz to 4 KHz is large is the same as that in the characteristic F1. By performing the frequency equalizing processing to the characteristic F2 and attenuating the vibration in a frequency band ranging from 2 KHz to 4 KHz, the frequency characteristic in the characteristic F3 as a whole is almost even. Further, the characteristic F3 after attenuating the vibration near the peak maintains the level of vibration comparable to that in the characteristic F1. Thus, the user is able to hear sound having more natural frequency characteristics at a sufficient volume without reducing a level of vibration conducted to the user while reducing sound leakage.

Next, the dynamic range compression during the large volume mode will be described. Many hard-of-hearing persons have difficulty in hearing small sound, but are able to hear large sound just like a person without hard-of-hearing. Specifically, simply increasing the volume may be possibly noisy and uncomfortable for such persons. Therefore, in this embodiment, the dynamic range compressor 555 performs the dynamic range compression processing of making small sound louder and amplifying large sound by a smaller magnitude than for the small sound. The dynamic range compression processing accommodates various types of hard-of-hearing with different audibility by performing dynamic range compression of different types for different frequency bands (by dividing into three bands of low, middle, and high, for example), respectively. According to this embodiment, as illustrated in FIG. 11, there are provided three dynamic range compressors including a Dynamic Range Compressor on low frequency 555a, a Dynamic Range Compressor on middle frequency 555b, and a Dynamic Range Compressor on high frequency 555c.

Figure 13:
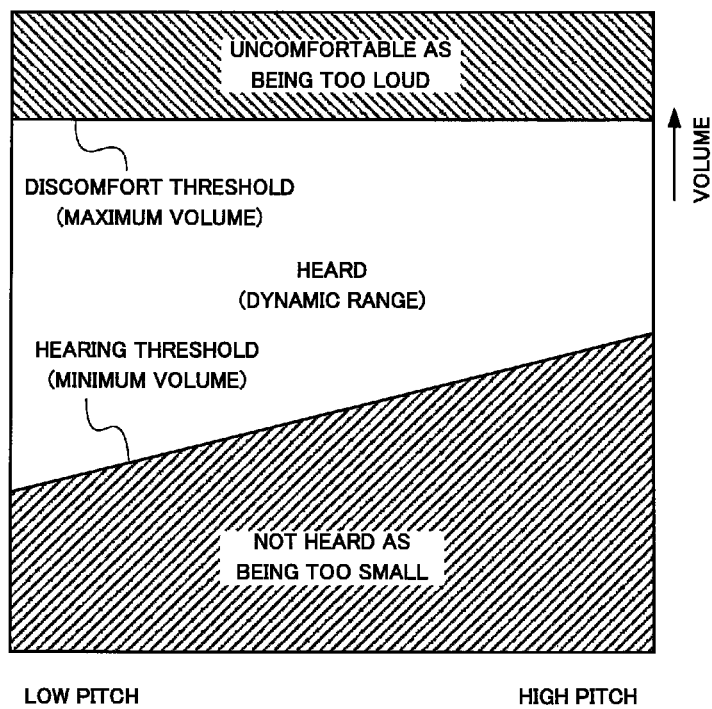
FIG. 13 is a graphical chart showing hearing ability of a hard-of-hearing person.

FIG. 13 is a graphical chart showing hearing ability of a hard-of-hearing person.

In FIG. 13, a left side corresponds to sound of lower pitch (low frequency), and a right side corresponds to sound of higher pitch (high frequency). Further, the volume becomes smaller to a bottom side.

If a volume of sound is small, the sound is too small to be heard. As the volume increases, the sound falls in a range of sound that can be heard. A threshold therebetween is referred to as a hearing threshold. The hearing threshold is a minimum volume that the user is able to hear.

Further increasing the volume of the sound from the range of sound that can be heard makes the sound fall in a range of sound that is too large and uncomfortable to hear. A threshold therebetween is referred to as a discomfort threshold. The discomfort threshold is a maximum volume that is acceptable for the user.

FIG. 13 is a graphical chart showing hearing ability of a person with common sensorineural hearing loss. For the sound of lower pitch, a range between sound too small to be heard and sound that is too loud and uncomfortable to hear (dynamic range) is wide. For the sound of higher pitch, on the other hand, a range between sound too small to be heard and sound that is too loud and uncomfortable to hear (dynamic range) is narrow. Therefore, in a case of such a type of hard-of-hearing, it is possible to provide better hearing by performing an increased magnitude of the dynamic range compression to the sound of higher pitch.

Figure 14:
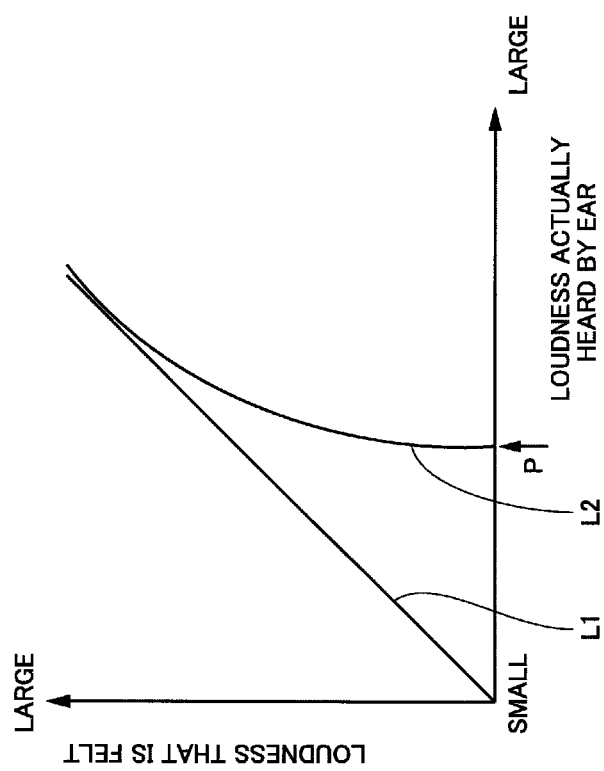
FIG. 14 is a diagram illustrating a recruitment phenomenon.

FIG. 14 is a diagram illustrating a recruitment phenomenon.

There is a case in which a person with sensorineural hearing loss may have a phenomenon called recruitment (recruitment hearing). A line L1 in FIG. 14 roughly indicates a relation between loudness that is actually heard by the ear and loudness that a normal hearer would feel. A line L2 roughly indicates a relation between the loudness that is actually heard by the ear and loudness that a hard-of-hearing person having recruitment would feel. While the relation between the loudness that is actually heard by the ear and the loudness that would be felt for the normal hearer are proportional as shown by the line L1, the hard-of-hearing person having recruitment is not able to hear sound smaller than a threshold P, and feels sound above the threshold as if the volume suddenly increased as shown by the line L2. Specifically, the small sound is hard to be heard, and the large sound is suddenly heard too loud and gives discomfort. Therefore, for the hard-of-hearing person having recruitment, instead of simply amplifying the sound, by amplifying the sound after making a difference between the small sound and the large sound smaller by performing the dynamic range compression processing in a suitable manner. Thus, it is possible to transmit sound that is easily heard by the person with sensorineural hearing loss.

Figure 15:
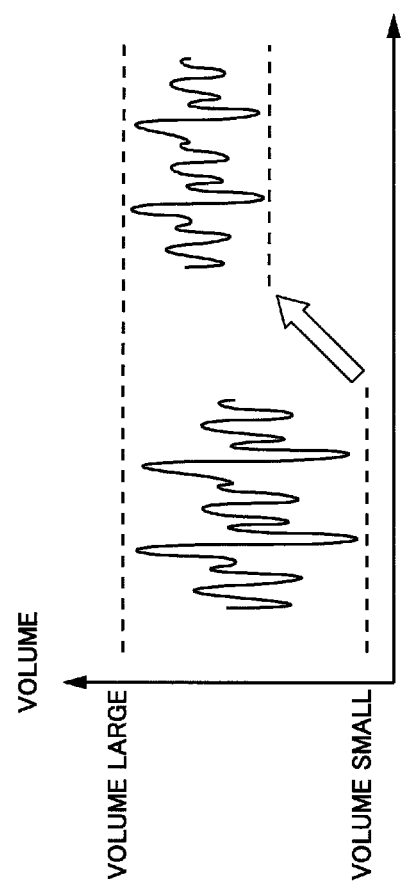
FIG. 15 is a diagram illustrating an outline of a dynamic range compression processing.

FIG. 15 is a diagram illustrating an outline of the dynamic range compression processing.

By the dynamic range compression processing, it is possible to make a difference between the small sound and the large sound smaller, and to substantially provide the same effect as increasing the volume of the small sound.

According to the embodiment, the case in which the equalizer unit 554 is provided before the amplifier 557 is taken as an example. However, a filter (a band-pass filter or a low-pass filter) may be inserted after the amplifier 557 in place of inserting the equalizer unit 554 before the amplifier 557.

Further, the configuration of the fifth embodiment may be applied to the second embodiment to the fourth embodiment.

As described above, according to the fifth embodiment, the communication device 500 uses the transducer 511 that provides a higher vibration output. Further, using the equalizer unit 554 and the dynamic range compressor 555 in the large volume mode, sound transmission easily heard for the hard-of-hearing person is realized. The sound is extremely easily heard for the hard-of-hearing person in this sound transmission, as the sound is conducted not only by the simple air conduction sound but also by the vibration conducting the human body.

While the embodiments of the present invention are described with reference to the drawing, specific configurations are not limited to these embodiments, and may include designs and the like that is not depart from the spirit of the invention.

Modified Embodiments (1) In the above embodiments, the case in which the transducer is surface joined to the protecting panel or the casing by the double-sided tape is taken as an example. Instead, an adhesive agent may be used, for example.

(2) In the above embodiments, the case in which the communication device is a mobile phone terminal is taken as an example. Instead, a different type of the communication device may be used such as a land-line phone or a wireless communication device, for example.

(3) In the second embodiment described with reference to FIG. 3 and FIG. 4, the case in which the casing 210 is provided with the transducer 211 and there is the air gap S between the casing 210 and the rear casing 220 is taken as an example. Instead, assuming that the casing 210 is a rear casing, and the rear casing 220 is a member corresponding to a protecting panel of a display unit (contact member), it is conceivable to provide the transducer for the casing on the side opposite of the display unit, for example. The contact member may be as large as to cover an entire back surface, or may be a part of the back surface at a position that can be easily brought into contact with the ear. The material of the contact member conforms to that used in the first embodiment, but may be non-transparent in this case. Further, if the entire back surface is used as the contact member, it is preferable to position the transducer above the position that can be easily brought into contact with the ear. Further, if a part of the back surface is used as the contact member, the transducer may be provided in the middle of the contact member. In such an example, the device may be used by bring the ear into contact with the casing on the opposite side of the display unit. When the device is used in this manner, it is preferable to position the microphone 203 illustrated in FIG. 3 on the opposite side of the display unit.

According to this example, it is possible to provide the same effects as those in the second embodiment, as well as effects such as making a bezel of the display unit narrower, eliminating sebum attaching to the surface of the protecting panel of display unit, and improving convenience.

(4) In the fifth embodiment, the thickness of and the number of the stack in the piezoelectric element constituting the transducer are suitably increased in order to provide the large volume mode is taken as an example. Instead, it is possible to change a width or a length of the transducer to increase the size of the transducer, or to make the piezoelectric material even more highly displaceable, for example. Further, for example, a plurality of parallelly arranged transducers may be mounted so that the plurality of transducers is appropriately arranged with respect to the same contact member.

While the first embodiment to the fifth embodiment as well as the modified embodiments may be utilized in appropriate combinations, details of such combinations are omitted.

REFERENCE SIGNS LIST 100, 200, 300, 400, 500: Communication Device
101, 201, 301, 401, 501: Protecting Panel
102, 202, 321, 402, 502: Operation Key
103, 203, 322, 403, 503: Microphone
110, 210, 410, 510: Casing
110a, 310a, 510a: Fixing Part
111, 211, 311, 411, 511: Transducer
112, 212, 312, 512: Line
113, 213, 313, 314, 513, 514: Double-Sided Tape
220: Rear Casing
310: First Casing
320: Second Casing
330: Shaft Section
340: Contact Member
404: Electromagnetic Receiver
551: Communication Unit
552: Drive Circuit
554: Equalizer Unit
555: Dynamic Range Compressor
555a: Dynamic Range Compressor on low frequency
555b: Dynamic Range Compressor on middle frequency
555c: Dynamic Range Compressor on high frequency
556: Output Power Controller
557: Amplifier
S, S2: Air Gap

The invention claimed is:

1. A communication device comprising:
a contact member disposed at a position at which at least a part of the contact member is brought into contact with at least one of a user's ear or a human body around the ear; and
a transducer surface-joined to the contact member, and configured to vibrate in a frequency band of an audible range to conduct sound and vibration from the contact member to an auditory organ;
wherein the transducer is a stacked piezoelectric element and is configured to apply bending vibration to the contact member;
wherein the maximum bending vibration occurs locally at a vibration position corresponding to a position at which the transducer is applied, the bending vibration being conducted from the vibration position to other positions of the contact member in a wavelike manner, and the amplitude becoming smaller as a distance from the vibration position becomes longer;
wherein the transducer is a stacked bimorph piezoelectric element configured in a plated shape that is rectangular when seen along a direction of a normal line of a surface of the plate;
wherein the transducer is configured to perform bending vibration,
wherein on a side opposite of a surface of the transducer in contact with the contact member, at least one of an air gap is provided or an elastic member that deforms following vibration of the transducer is brought into contact;
wherein the contact member and the transducer are surface-joined by a double-sided tape;
wherein the communication device is able to operate in a large volume mode for transmitting sound to the user in a volume larger than that in a normal use;
wherein the communication device further comprises an amplifier unit configured to amplify a sound signal for causing the transducer to vibrate during the large volume mode;
wherein during the large volume mode, a measured value of air conduction sound at a position of an eardrum of a dummy head having a dummy ear is no lower than 100 dBA at a frequency of 1 kHz in a state in which the contact member is pressed against the dummy ear at a pressure from 4 N to 10 N centering a position immediately above the transducer or a position at which a maximum output is obtained.

2. A communication device comprising:
a contact member disposed at a position at which at least a part of the contact member is brought into contact with at least one of a user's ear or a human body around the ear; and
a transducer surface-joined to the contact member, and configured to vibrate in a frequency band of an audible range to conduct sound and vibration from the contact member to an auditory organ;
wherein the transducer is a stacked piezoelectric element and is configured to apply bending vibration to the contact member;
wherein the maximum bending vibration occurs locally at a vibration position corresponding to a position at which the transducer is applied, the bending vibration being conducted from the vibration position to other positions of the contact member in a wavelike manner, and the amplitude becoming smaller as a distance from the vibration position becomes longer;

wherein the transducer is a stacked bimorph piezoelectric element configured in a plated shape that is rectangular when seen along a direction of a normal line of a surface of the plate;

wherein the transducer is configured to perform bending vibration, wherein on a side opposite of a surface of the transducer in contact with the contact member, at least one of an air gap is provided or an elastic member that deforms following vibration of the transducer is brought into contact;

wherein the contact member and the transducer are surface-joined by a double-sided tape;

wherein the communication device is able to operate in a large volume mode for transmitting sound to the user in a volume larger than that in a normal use;

wherein the communication device further comprises an amplifier unit configured to amplify a sound signal for causing the transducer to vibrate during the large volume mode;

further comprising:

a dynamic range compressor configured to compress a dynamic range of the signal.

3. A communication device comprising:

a contact member disposed at a position at which at least a part of the contact member is brought into contact with at least one of a user's ear or a human body around the ear; and a transducer surface-joined to the contact member, and configured to vibrate in a frequency band of an audible range to conduct sound and vibration from the contact member to an auditory organ;

wherein the transducer is a stacked piezoelectric element and is configured to apply bending vibration to the contact member;

wherein the maximum bending vibration occurs locally at a vibration position corresponding to a position at which the transducer is applied, the bending vibration being conducted from the vibration position to other positions of the contact member in a wavelike manner, and the amplitude becoming smaller as a distance from the vibration position becomes longer;

wherein the transducer is a stacked bimorph piezoelectric element configured in a plated shape that is rectangular when seen along a direction of a normal line of a surface of the plate;

wherein the transducer is configured to perform bending vibration, wherein on a side opposite of a surface of the transducer in contact with the contact member, at least one of an air gap is provided or an elastic member that deforms following vibration of the transducer is brought into contact;

wherein the contact member and the transducer are surface-joined by a double-sided tape;

wherein the communication device is able to operate in a large volume mode for transmitting sound to the user in a volume larger than that in a normal use;

wherein the communication device further comprises an amplifier unit configured to amplify a sound signal for causing the transducer to vibrate during the large volume mode;

further comprising:

an equalizer unit configured to perform frequency equalizing during the large volume mode.

4. The communication device according to claim 1, further comprising:

a dynamic range compressor configured to compress a dynamic range of the signal.

5. The communication device according to claim 4, further comprising:

an equalizer unit configured to perform frequency equalizing during the large volume mode.

6. The communication device according to claim 5, wherein the equalizer unit suppresses a volume of sound in a frequency band from 2 kHz to 4 kHz.

7. The communication device according to claim 3, wherein the equalizer unit suppresses a volume of sound in a frequency band from 2 kHz to 4 kHz.

8. The communication device according to claim 1, wherein the contact member is disposed with a space from a casing of the communication device so as not to be in direct contact with the casing.

9. The communication device according to claim 2, wherein the contact member is disposed with a space from a casing of the communication device so as not to be in direct contact with the casing.

* * * * *